(12) United States Patent
Schmidt

(10) Patent No.: US 11,001,293 B2
(45) Date of Patent: May 11, 2021

(54) STEERING SHAFT FOR A MOTOR VEHICLE

(71) Applicants: THYSSENKRUPP PRESTA AG, Eschen (LI); thyssenkrupp AG, Essen (DE)

(72) Inventor: René Marco Schmidt, Lienz (CH)

(73) Assignees: thyssenkrupp Presta AG, Eschen (LI); thyssenkrupp AG, Essen (DE)

( * ) Notice: Subject to any disclaimer, the term of this patent is extended or adjusted under 35 U.S.C. 154(b) by 41 days.

(21) Appl. No.: 16/349,554

(22) PCT Filed: Dec. 4, 2017

(86) PCT No.: PCT/EP2017/081323
§ 371 (c)(1),
(2) Date: May 13, 2019

(87) PCT Pub. No.: WO2018/104209
PCT Pub. Date: Jun. 14, 2018

(65) Prior Publication Data
US 2020/0189647 A1 Jun. 18, 2020

(30) Foreign Application Priority Data
Dec. 6, 2016 (DE) ...................... 10 2016 224 271.7

(51) Int. Cl.
*B62D 1/20* (2006.01)
*F16C 33/78* (2006.01)
(Continued)

(52) U.S. Cl.
CPC ................. *B62D 1/20* (2013.01); *B62D 1/16* (2013.01); *F16C 3/035* (2013.01); *F16C 29/04* (2013.01);
(Continued)

(58) Field of Classification Search
CPC .......... F16C 3/035; F16C 29/04; F16C 29/08; F16C 33/7893; F16C 2326/24; F16C 33/6607; F16D 3/065
See application file for complete search history.

(56) References Cited

U.S. PATENT DOCUMENTS 2,994,567 A * 8/1961 Warner ................. F16C 33/385
384/15
3,788,714 A * 1/1974 Degioia ................ F16C 33/412
384/482
(Continued)

FOREIGN PATENT DOCUMENTS

CN      105128923 A    12/2015
CN      205589293 U     9/2016
(Continued)

OTHER PUBLICATIONS

English Translation of International Search Report issued in PCT/EP2017/081323, dated Apr. 11, 2018.

*Primary Examiner* — Ruth Ilan
(74) *Attorney, Agent, or Firm* — thyssenkrupp North America, LLC

(57) ABSTRACT

A steering shaft for a motor vehicle includes a hollow shaft and an inner shaft which is arranged coaxially in the hollow shaft. The inner shaft is configured to be telescoped relative to the hollow shaft in the direction of the longitudinal axis of the steering shaft and is connected in a torque-transmitting manner to the hollow shaft via at least one rolling body. The rolling body is received in a rolling body cage such that it can roll in the direction of the longitudinal axis between the inner shaft and the hollow shaft. In order to achieve a high operational reliability with a relatively low manufacturing complexity, the rolling body cage has at least one seal element which bears sealingly against the hollow shaft and/or the inner shaft.

9 Claims, 2 Drawing Sheets

(51) Int. Cl.
    *B62D 1/16* (2006.01)
    *F16C 3/035* (2006.01)
    *F16C 29/04* (2006.01)
    *F16C 29/08* (2006.01)
    *F16D 3/06* (2006.01)

(52) U.S. Cl.
    CPC .......... *F16C 29/08* (2013.01); *F16C 33/7893* (2013.01); *F16D 3/065* (2013.01); *F16C 2326/24* (2013.01)

(56) References Cited

U.S. PATENT DOCUMENTS

| | | | | |
|---|---|---|---|---|
| 4,509,386 | A | * | 4/1985 | Kimberlin .............. B62D 1/192 188/371 |
| 4,981,459 | A | * | 1/1991 | Klinkenberg ........... F16C 3/035 464/167 |
| 5,345,679 | A | * | 9/1994 | Lennon ................... B29C 53/06 29/441.1 |
| 6,585,602 | B2 | * | 7/2003 | Cermak .................. F16C 3/035 464/167 |
| 8,182,354 | B2 | * | 5/2012 | Jung ....................... F16D 3/065 464/167 |
| 9,126,623 | B2 | * | 9/2015 | Linde ....................... B62D 1/20 |
| 10,378,577 | B2 | * | 8/2019 | Wilkes .................... F16C 33/46 |
| 10,538,264 | B2 | * | 1/2020 | Abonyi ................... F16C 29/04 |
| 2001/0018369 | A1 | | 8/2001 | Cermak |
| 2009/0280914 | A1 | * | 11/2009 | Kakutani ................ F16C 29/04 464/167 |
| 2017/0356487 | A1 | * | 12/2017 | Muntener ............... F16D 3/065 |
| 2019/0316635 | A1 | * | 10/2019 | Schwarzhans .......... F16C 39/02 |

FOREIGN PATENT DOCUMENTS

| | | | | |
|---|---|---|---|---|
| CN | 106089970 A | | 11/2016 | |
| DE | 1267479 B | * | 5/1968 | ............. F16D 3/065 |
| DE | 3730393 A | | 3/1989 | |
| DE | 10259446 A1 | * | 7/2004 | ............. F16C 3/035 |
| DE | 20 2009 006 128 U | | 7/2009 | |
| DE | 10 2014 017 555 A | | 6/2016 | |
| GB | 859821 A | * | 1/1961 | .......... F16C 33/7893 |
| GB | 875225 A | * | 8/1961 | ............ F16C 19/466 |
| GB | 1291245 A | * | 10/1972 | ............. F16C 19/08 |

\* cited by examiner

STEERING SHAFT FOR A MOTOR VEHICLE

CROSS REFERENCE TO RELATED APPLICATIONS

This application is a U.S. National Stage Entry of International Patent Application Serial Number PCT/EP2017/081323, filed Dec. 4, 2017, which claims priority to German Patent Application No. DE 10 2016 224 271.7, filed Dec. 6, 2016, the entire contents of both of which are incorporated herein by reference.

FIELD

The present disclosure generally relates to a steering shaft for a motor vehicle.

BACKGROUND

The use of a steering shaft which can telescope in its axial direction in a motor vehicle makes an adjustment of the steering column possible in order to set the steering wheel position in the longitudinal direction. Moreover, in the case of a crash, the steering shaft can be telescoped in the direction of its longitudinal axis, as a result of which it is prevented effectively that the steering column penetrates into the interior of the passenger compartment and leads to injuries of the occupants. This is achieved by way of two shafts which can be telescoped with respect to one another, namely a hollow shaft which is formed as an outer shaft or external shaft by way of a tubular hollow profile, and an inner shaft which is mounted therein in a telescope-like manner in the direction of the longitudinal axis of the steering shaft, that is to say can be displaced coaxially and axially, at the rear (with regard to the driving direction) end of which inner shaft of the steering wheel is mounted. The steering shaft can be shortened or lengthened by way of telescoping retraction or extension of the inner shaft and the hollow shaft.

In the structural design of the generic type, at least one rolling body, as a rule a plurality of rolling bodies, is/are arranged between the hollow shaft and the inner shaft. The rolling bodies can roll in the direction of the longitudinal axis between the outer face of the inner shaft and the inner face of the hollow shaft, with the result that a smooth axial adjustability (mounted by rolling bodies) of the inner shaft relative to the hollow shaft is realized. In order to transmit the torque which is introduced for steering purposes, the inner shaft has, on its outer side, and the hollow shaft has, on its inner side, groove-shaped rolling body raceways which lie radially opposite one another, run in the direction of the longitudinal axis, and between which the rolling bodies are arranged and serve as positively locking elements, as a result of which a positively locking connection which is active with regard to a rotation about the longitudinal axis is formed, which positively locking connection connects the hollow shaft and the inner shaft to one another in a torque-transmitting manner. Steering shafts of the generic type are therefore also called slide and roll shafts.

The rolling bodies are received in a rolling body cage such that they can rotate freely about the rolling axes, as described, for example, in DE 10 2014 017 555 A1, as a result of which they are held in position and guided between the shafts and, in particular, at a spacing relative to one another.

In order to reduce the friction which occurs and therefore the adjusting forces, to reduce wear and to increase the service life, a lubricant (as a rule, a lubricating grease) is introduced between the hollow shaft and the inner shaft, by way of which lubricant those contact faces of the rolling bodies which are moved relative to one another with the rolling body raceways and the rolling body cage are lubricated. It has to be ensured for disruption-free operation in the long term that the lubricating action of the lubricating grease is not impaired by contaminants which penetrate from the outside. Moreover, it has to be prevented that the lubricating grease which is distributed within the hollow shaft as a result of the relative movements in the axial direction which occur during operation escapes to the outside from the steering shaft.

To this end, it is known from the cited document DE 10 2014 017 555 A1 to attach a covering cap on the opening of the hollow shaft, through which covering cap the inner shaft is guided to the outside in a sealed manner. Said covering cap has to be manufactured and mounted as a separate component, however, as a result of which the manufacturing complexity and the costs are increased. Moreover, a sufficiently great quantity of lubricating grease has to be filled between the hollow shaft and the inner shaft, in order to ensure reliable lubrication over the entire axial adjusting range of the steering shaft in all conceivable operating conditions.

Thus, a need exists for an improved steering shaft that provides a high operational reliability with a relatively low manufacturing complexity.

DETAILED DESCRIPTION

Figure 1:
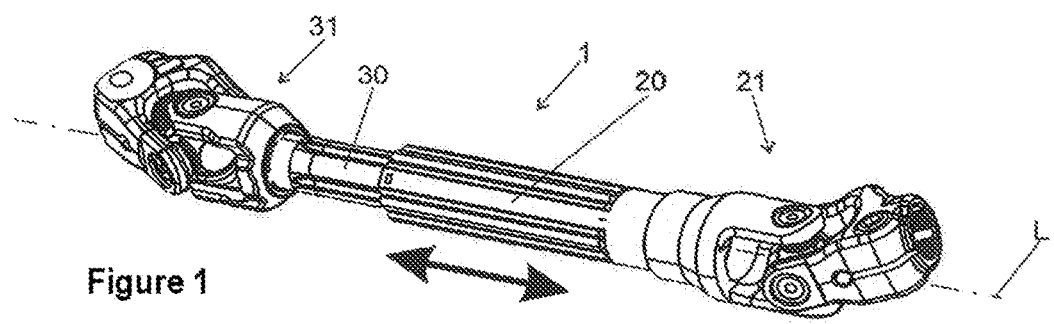
FIG. 1 is a diagrammatic perspective view of a steering shaft.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The invention relates to a steering shaft for a motor vehicle, comprising a hollow shaft and an inner shaft which is arranged coaxially in the hollow shaft, can be telescoped relative to the hollow shaft in the direction of the longitudinal axis of the steering shaft, and is connected in a torque-transmitting manner to the hollow shaft via at least one rolling body, the rolling body being received in a rolling body cage such that it can roll in the direction of the longitudinal axis between the inner shaft and the hollow shaft.

In some examples, the rolling body cage has at least one seal element which bears sealingly against the hollow shaft and/or the inner shaft.

The seal element according to the invention is fastened tightly to the rolling body cage and seals the latter against the outer shaft or the inner shaft, preferably against the inner shaft and the outer shaft. During the adjusting of the steering shaft, it is moved in the axial direction relative to the inner shaft and the hollow shaft together with the rolling body cage and the rolling bodies which are held therein such that they can roll; as a consequence, it forms a sliding seal with regard to a linear movement in the direction of the longitudinal axis, which sliding seal sales an intermediate space between the rolling body cage and a hollow shaft and/or the inner shaft to the outside, at least toward the opening of the hollow shaft, that is to say undesired material transfers from one space (for example, the lubricant container) into another are prevented or at least limited. Therefore, a lubricant container which is moved together with the rolling body cage in the axial direction relative to the inner shaft and the hollow shaft is realized by way of the seal element. Said lubricant container is delimited spatially by way of the seal element, the rolling body cage and by way of the respective regions of the inner side of the hollow shaft and the outer face of the inner shaft, in which the rolling body cage is situated. A supply of lubricant, for example lubricating grease, can be received in the lubricant container which is sealed by way of the seal element. The seal element is arranged in such a way that the rolling element or elements is/are situated within the sealed region of the lubricant container, and are correspondingly wetted and lubricated by way of the lubricant which is enclosed therein.

The spatial region which is sealed to the outside in accordance with the invention by way of the seal element between the rolling body cage and the inner shaft and outer shaft and can be called a lubricant container is protected by way of the seal element against penetration of contaminants from the outside, and the escape of lubricant to the outside is likewise prevented reliably.

It is a further advantage of the invention that the spatial region of the lubricant container, which spatial region is delimited by way of the seal element according to the invention, is smaller than the entire intermediate space between the inner shaft and the hollow shaft. As a result, it is possible to realize an improved lubrication of the rolling bodies which is reliable under all operating conditions by way of a supply of lubricant which is smaller in comparison with known slide and roll shafts. The operational reliability is increased as a result.

Moreover, the seal element according to the invention can be produced in an integrated manner together with the rolling body cage and can be mounted in a single work operation together with said rolling body cage. Accordingly, the manufacturing complexity, mounting complexity and cost outlay are reduced.

One preferred embodiment of the invention provides that at least one seal element is configured so as to run around the rolling body cage. The seal element which runs around in this way is arranged coaxially with respect to the longitudinal axis, that is to say so as to run around the longitudinal axis, and preferably bears sealingly against the inner side of the hollow shaft and the outer side of the inner shaft. As a result, together with the seal element, the rolling body cage forms a type of piston with an annular cross section which is arranged in a sealed manner between the inner shaft and the hollow shaft such that it can be moved linearly in the axial direction. The lubricant is held in the region of the rolling body cage by way of the seal element, and an escape of the lubricant from the hollow shaft is prevented.

The seal element can have at least one outer sealing face which is arranged on the outer side, that is to say which is arranged on the anti-friction bearing cage radially on the outside, and bears sealingly against the inner side, that is to say the radially inner inside face of the hollow shaft, and can slide along in the axial direction, and can preferably have an inner sealing face which is arranged on the inner side, that is to say the side which is directed radially to the inside on the anti-friction bearing cage, and bears sealingly against the outer side, that is to say the radially outer outside face of the hollow shaft, and can slide along on the axial direction. Here, the circumferential contour of the sealing element is adapted in the region of the sealing faces in each case to the cross-sectional contours of the hollow shaft and the inner shaft, in particular is also adapted to the groove-shaped rolling body raceways, with the result that an intermediate space between the rolling body cage and the inner shaft and the hollow shaft is sealed axially.

It is advantageous that at least two circumferential seal elements are arranged at an axial spacing from one another. Here, a spatial region is delimited in the direction of the longitudinal axis between two of the above-described seal elements which preferably seal the anti-friction bearing cage against the hollow shaft and the inner shaft, which spatial region forms a closed lubricant container of the above-described type which is sealed to the outside. Said lubricant container is delimited by way of the seal elements, those axial sections of the inner and outer faces of the hollow shaft and the inner shaft which lie between the seal elements, and the inner and outer faces of the rolling body cage. In the case of a longitudinal movement of the rolling body cage relative to the hollow shaft and the inner shaft during adjusting of the steering column, the lubricant container is also moved correspondingly in the axial direction, the lubricant remaining enclosed between the two seal elements in the region of the anti-friction bearing cage.

The rolling body or bodies is/are preferably arranged in the direction of the longitudinal axis between the two seal elements which are spaced apart axially. As a result, the rolling bodies are situated within the lubricant container, with the result that they are surrounded and lubricated by the lubricant which is enclosed therein, preferably lubricating grease. As a result of the seal elements according to the invention, the lubricant is driven along reliably on the rolling body cage in the region of the rolling bodies even in the case of relatively great movements, and is not distributed over the length of the rolling body raceways between the hollow shaft and the inner shaft as in the prior art.

At least one seal element is preferably arranged on an axial end region of the rolling body cage, and two circumferential seal elements are particularly preferably arranged on the two axial end regions of the rolling body cage. The lubricant container which is formed by way of said frontal arrangement of the seal elements extends over the axial length of the rolling body cage. As a result, all of the rolling bodies which are received by the rolling body cage can be supplied with the lubricating grease which is enclosed between the seal elements. Here, the entire rolling body cage forms a piston which is sealed against the hollow shaft and the inner shaft and has a lubricant container which is filled with lubricant between the seal elements which are arranged on the end side, in which lubricant container the rolling bodies run in the lubricant.

It is possible that at least one seal element is configured so as to run around on a circumferential face of the rolling body cage. Here, the seal element has a sealing face which encloses a surface region of the circumferential face. The seal element once again preferably bears with its sealing face against the inner face of the hollow shaft and the outer face of the inner shaft. As a result, a closed spatial region is sealed by the seal element, which spatial region forms a lubricant container which extends over a part region of the circumference.

A seal element which is configured so as to run around in the circumferential face of the rolling body cage can preferably enclose at least one rolling body, preferably a group of rolling bodies. Here, a space which surrounds the rolling bodies at a relatively small spacing can be sealed by way of the seal element; in other words, a lubricant container with a relatively small volume, which lubricant container substantially receives the rolling bodies. A group of enclosed rolling bodies can comprise, for example, a row of a plurality of rolling bodies which are arranged so as to follow one another in a rolling body raceway in the direction of the longitudinal axis.

The seal element can be of elastic configuration. It can have, for example, an elastic sealing lip with a sealing face which is in sealing contact as a contact face with the hollow shaft and/or the inner shaft. As a result of the elastic configuration of the seal element, the sealing face can be pressed resiliently against the surface; as a result, low sliding friction with a satisfactory sealing effect can be realized, as a result of which a low adjusting force is made possible. The elasticity can be achieved by way of the use of an elastic material, such as rubber or a thermoplastic elastomer, or by way of shaping with an narrow, flexible sealing edge or web-shaped sealing lip.

A seal element can be manufactured and provided separately, which seal element is subsequently connected to the rolling body cage. For example, an O-ring made from an elastomer material can be inserted into a seal element receptacle, for example a circumferential groove, which runs along the sealing face on the seal element. Here, the seal element can be held in position in a positively locking manner, or can be fixed in an integrally joined manner as an alternative or in addition, for example by way of adhesive bonding or welding. As an alternative, a seal element can be configured in a flat ring-shaped manner, with a contour which is adapted to the cross section between the hollow shaft and the inner shaft, with the result that it can be attached frontally on the anti-friction bearing cage on one or both axial end sides.

One advantageous embodiment provides that the seal element is configured integrally in one piece with the rolling body cage. This can be realized by virtue of the fact that the rolling body cage has a seal cross section in sections, which seal cross section coincides substantially in terms of shape and dimensions with the free cross section between the hollow shaft and the inner shaft. The seal element which is formed as a result bears with its circumferential contour and a small amount of play in a sealing manner against the hollow shaft and the inner shaft. Here, the rolling body cage in practice represents a single-piece piston of annular cross section which is inserted coaxially between the inner shaft and the hollow shaft in a sealed manner, so as to slide in the direction of the longitudinal axis. The material can preferably be selected in such a way that the seal element or elements can be designed to seal with low play, and in the process to slide smoothly.

A single-piece configuration can be realized by virtue of the fact that the rolling body cage is configured as a plastic injection molded part. Here, a thermoplastic polymer with suitable properties, for example with regard to strength and sliding properties, can be selected, which thermoplastic polymer can be manufactured using the injection molding process with a shape which is adapted precisely to the cross section to be sealed between the hollow shaft and the inner shaft. It is possible to manufacture the anti-friction bearing cage from a single polymer material. As an alternative, it is possible to likewise mold the seal element or elements in one piece from a second polymer using the injection molding process, in what is known as two color injection molding, for example in order to configure an elastic seal element from a softer thermoplastic elastomer on a dimensionally stable main body of the rolling body cage made from a dimensionally stable first thermoplastic polymer.

A rolling body cage which is manufactured as a plastic injection molded part does not necessarily have to be configured in one piece with the seal element, however, but rather can have one or more receptacles, for the subsequent fastening of one or more seal elements, for example in the form of O-rings.

The spatial region which is enclosed between a seal element and the rolling body cage and/or the inner shaft and/or the hollow shaft is preferably filled at least partially with a lubricant. The lubricant can be a viscous lubricating grease, for example what is known as anti-friction bearing grease, or else a solid lubricant on the basis of graphite or molybdenum disulfide. According to the invention, the lubricant is enclosed in a sealed manner in the lubricant container which is formed between the seal element, the rolling body cage and the inner shaft and the outer shaft.

With regard to the arrangement of the rolling bodies, for example balls, the rolling body cage can be designed as is known per se from the prior art. Here, a plurality of rolling bodies are as a rule received in a freely rotatable manner in the rolling body cage in defined positions at a spacing from one another. In particular, at least one group of rolling bodies can form a rolling body row in the axial direction in each case at an axial spacing adjacently in the direction of the longitudinal axis, which rolling bodies can roll in a rolling body raceway. The rolling bodies can be arranged distributed at an angular spacing in the circumferential direction individually, or else in said rolling body rows, preferably distributed uniformly over the circumference. The rolling body cage has corresponding receptacles for the rolling bodies, in which in each case one rolling body, for example a ball, is received. In the receptacles, the rolling bodies can rotate freely about their rolling axis; here, the rolling bodies project radially out of the receptacles to the inside and to the outside, with the result that they can roll on the anti-friction bearing raceway is in an unimpeded manner. In the present invention, the receptacles of the rolling bodies are situated in the region which is delimited by way of the seal element or elements, within the lubricant container which is formed as a result, with the result that the lubrication takes place by way of the lubricating grease which is filled therein.

FIG. 1 shows a perspective view of a diagrammatically shown steering shaft 1 which has a hollow shaft 20 (also called an outer shaft or outside shaft) and an inner shaft 30 (also called an inside shaft) which can be telescoped with respect to one another in the direction of the longitudinal axis L, that is to say in the axial or longitudinal direction which is indicated by way of the double arrow.

At its free end which faces away in the longitudinal direction with regard to the inner shaft 30, the hollow shaft 20 has a fork 21 which forms a part of a universal joint, by way of which the steering shaft 1 is connected in a torque-transmitting manner to the steering line. In a corresponding manner, at its free end which faces away in the longitudinal direction with regard to the hollow shaft 20, the inner shaft 30 has a fork 31 which forms a part of a further universal joint, by way of which the steering shaft 1 is connected in a torque-transmitting manner to the steering line. The shafts 20 and 30 are preferably both manufactured as hollow profiles from steel which can be cold formed in a satisfactory manner.

Figure 2:
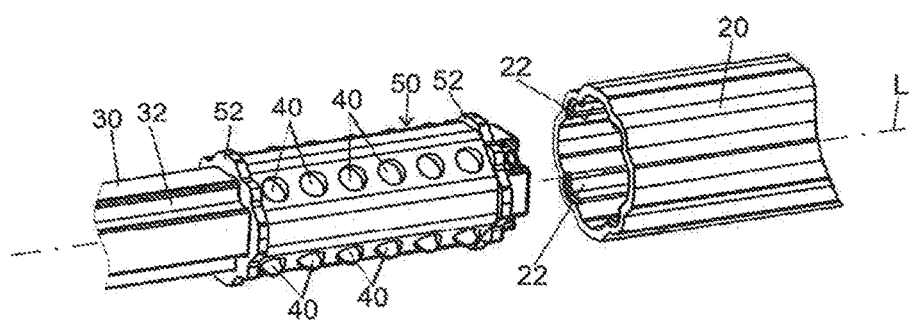
FIG. 2 is a partial view of a steering shaft according to FIG. 1 in an exploded state.

FIG. 2 shows the steering shaft 1 according to FIG. 1 in an exploded illustration, in which the inner shaft 30 is shown pulled out of the hollow shaft 20 in the direction of the longitudinal axis L.

Figure 3:
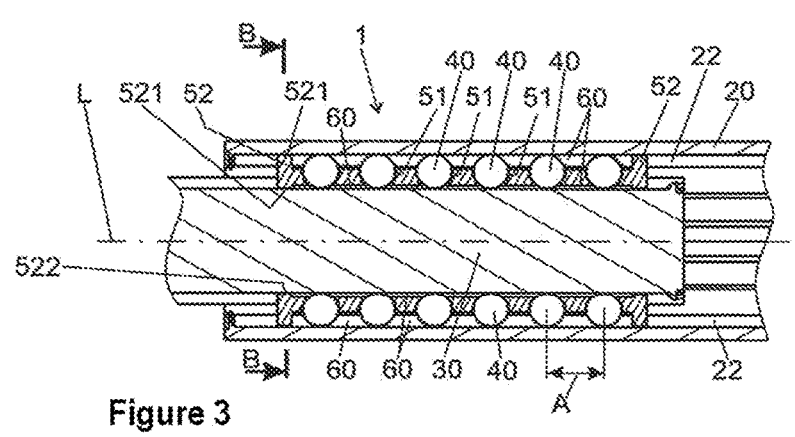
FIG. 3 is a longitudinal sectional view along the longitudinal axis through the steering shaft according to FIG. 1.

Rolling bodies which are configured as balls 40 are arranged between the hollow shaft 20 and the inner shaft 30, as can be seen clearly in the longitudinal section in FIG. 3.

In its inner face, the hollow shaft 20 has grooves 22 which are continuous in the longitudinal direction, and the inner shaft 30 has corresponding grooves 32 which lie radially opposite said grooves 22 and serve as rolling body raceways for the balls 40, that is to say form ball raceways. The balls 30 are arranged between said grooves 22 in such a way that they can roll therein in the direction of the longitudinal axis L and therefore form a linear anti-friction bearing system for a telescoping relative movement of the inner shaft 30 and the hollow shaft 20. Moreover, the balls 40 act as positively locking elements which engage into the grooves 22 and 32 in a positively locking manner with regard to a relative rotation about the longitudinal axis L, as a result of which they transmit a torque which is introduced into the inner shaft 30 as a steering torque to the hollow shaft 20. In the example which is shown, in each case four grooves 22 and 32 are arranged distributed about the longitudinal axis L in the circumferential direction. The inner shaft 30 is configured as a solid shaft. It is likewise conceivable and possible, however, that the inner shaft 30 is configured as a hollow shaft.

The balls 40 are received in an anti-friction bearing cage 50 which is configured as a ball cage. The anti-friction bearing cage 50 has a rolling body receptacle 51 for each of the balls 40 in the form of a radially continuous opening, in which in each case one ball 40 is received such that it can rotate freely with play and projects radially to the inside and to the outside to such an extent that it can roll in the grooves 22 and 32 in the longitudinal direction in an unimpeded manner.

In each case a plurality of rolling body receptacles 51 are arranged in the longitudinal direction in each case at a spacing A from one another, with the result that the balls 40 which are received therein in each case form an axial ball row 41, comprising in each case six balls 40 in the example which is shown, which balls 40 can roll between grooves 22 and 32 which lie opposite one another radially in each case in pairs. By way of the rolling body cage 50, the balls 40 of the ball rows are guided at the spacing A from one another in the case of a telescoping relative movement of the inner shaft 30 and the hollow shaft 20.

In the embodiment according to FIGS. 2, 3, 4 and 5, the rolling body cage 50 has seal elements 52 according to the invention, of which in each case one is arranged in an axial end region of the rolling body cage 50.

Figure 4:
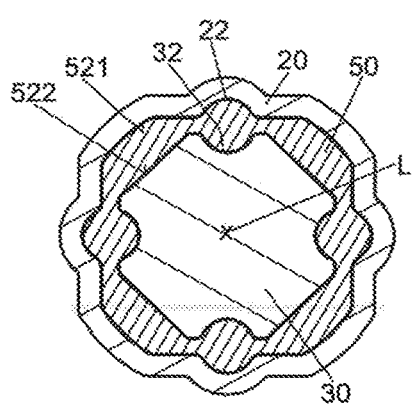
FIG. 4 is a cross-sectional view B-B through the steering shaft according to FIG. 3.

FIG. 4 shows an axial view from the left of a cross section B-B through the steering shaft 1 according to FIG. 3 (indicated by way of the arrow as in FIG. 3). It can be seen from this that the seal element 52 tightly fills the radial, substantially annular cross section of the intermediate space between the inner shaft 30 and the hollow shaft 20. Here, on its outer circumference which forms an outer circumferential sealing face 521 with regard to the longitudinal axis L, the seal element 52 bears sealingly from the inside against the inner face of the hollow shaft 20. On its inner circumference, the seal element 52 has an inner circumferential sealing face 522, by way of which it bears sealingly against the outer face of the inner shaft 30. As can be seen clearly from FIG. 4, the sealing faces 521 and 522 follow the cross-sectional contours of the inner shaft 30 and the hollow shaft 20 which is configured as an outer shaft including the grooves 32 and 22, with the result that the inner shaft 30 is sealed against the hollow shaft 20. In other words, the seal element 52 brings it about that the anti-friction bearing cage 50 is guided in the longitudinal direction in a sealed manner as a type of annular piston between the hollow shaft 20 and the inner shaft 30. Here, the seal element 52 is dimensioned in such a way that the circumferential play permits smooth sliding of the rolling body cage 50 in the direction of the longitudinal axis L, but as far as possible prevents an entry of contaminants between the inner shaft 30 and the hollow shaft 20 and also an escape of lubricant from the intermediate space between the inner shaft 30 and the hollow shaft 20.

It is apparent from FIG. 3 that in each case one seal element 52 is arranged in an axial end region of the rolling body cage 50. By way of the above-described sealing means, a sealed spatial region 60 is delimited axially by way of the two seal elements 52 over the length of the rolling body cage 50 between the inner shaft 30 and the hollow shaft 20. As a consequence, said spatial region 60 is enclosed by way of the two seal elements 52, the sections of the hollow shaft 20 and the inner shaft 30, which sections extend over the length of the anti-friction bearing cage 50, and the surface regions of the anti-friction bearing cage 50 which lie between the seal elements 52.

Lubricant, namely lubricating grease, is introduced into the spatial region 60, with the result that the spatial region 60 serves as a lubricant container. As a result, the balls 40 which are likewise situated in the spatial region 60 are surrounded by lubricating grease, with the result that their rolling movement in the grooves 22 and 32 and also in the rolling body receptacles 51 is lubricated in the case of a telescoping relative movement of the hollow shaft 20 and the inner shaft 30.

The lubricant is enclosed in a sealed manner by way of the seal elements 52 according to the invention in the spatial region 60 which is also moved with the rolling body cage 50 in the direction of the longitudinal axis L. This ensures that there is sufficient lubricating grease for sufficient lubrication in the region of the balls 40 in the long term, even after a multiplicity of longitudinal adjustments of the steering shaft 1. Here, the lubricant is not distributed irregularly over the entire length of the adjusting region as in the prior art, with the result that a smaller quantity of lubricating grease is sufficient. The undesired escape of lubricant from the hollow shaft 20 is largely prevented by way of the seal elements 52, as is the entry of contaminants into the spatial region 60, which entry might impair the lubricating action.

Figure 5:
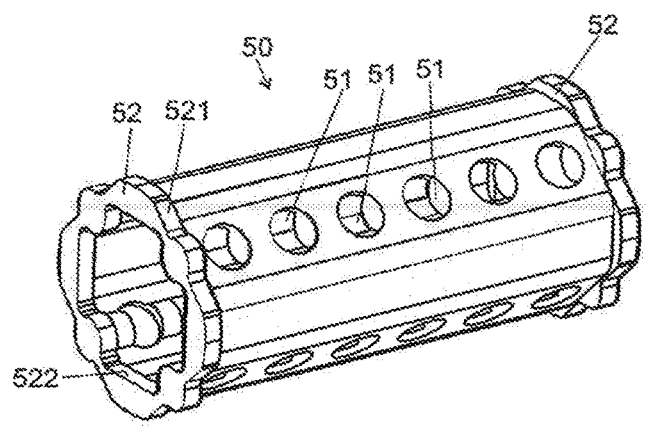
FIG. 5 is a perspective view of the anti-friction bearing cage of the steering shaft according to FIG. 1 in a first embodiment.

As is shown individually in an exposed manner in FIG. 5, the rolling body cage 50 including the seal elements 52 according to the invention can be produced as a single-piece integral component, preferably as a plastic injection molded part. Here, the rolling body cage 50 can be manufactured from a single thermoplastic material, for example from polyoxymethylene (POM), polypropylene (PP) or the like, or the body of the rolling body cage 50, in which the rolling body receptacles 51 are configured, is molded from a first thermoplastic polymer which has a high mechanical strength, and the seal elements 52 are molded from a rubber-like, elastic thermoplastic elastomer onto the body of the rolling body cage 50, likewise using the injection molding process. As a result of the elastomer, for example, sealing lips can be molded which run around along the sealing faces 521 and 522. Sealing lips of this type are elastically deformable and bear resiliently against the hollow shaft 20 and the inner shaft 30, as a result of which a particularly satisfactory sealing effect is achieved, and at the same time a smooth displaceability of the rolling body cage 50 remains ensured.

Figure 6:
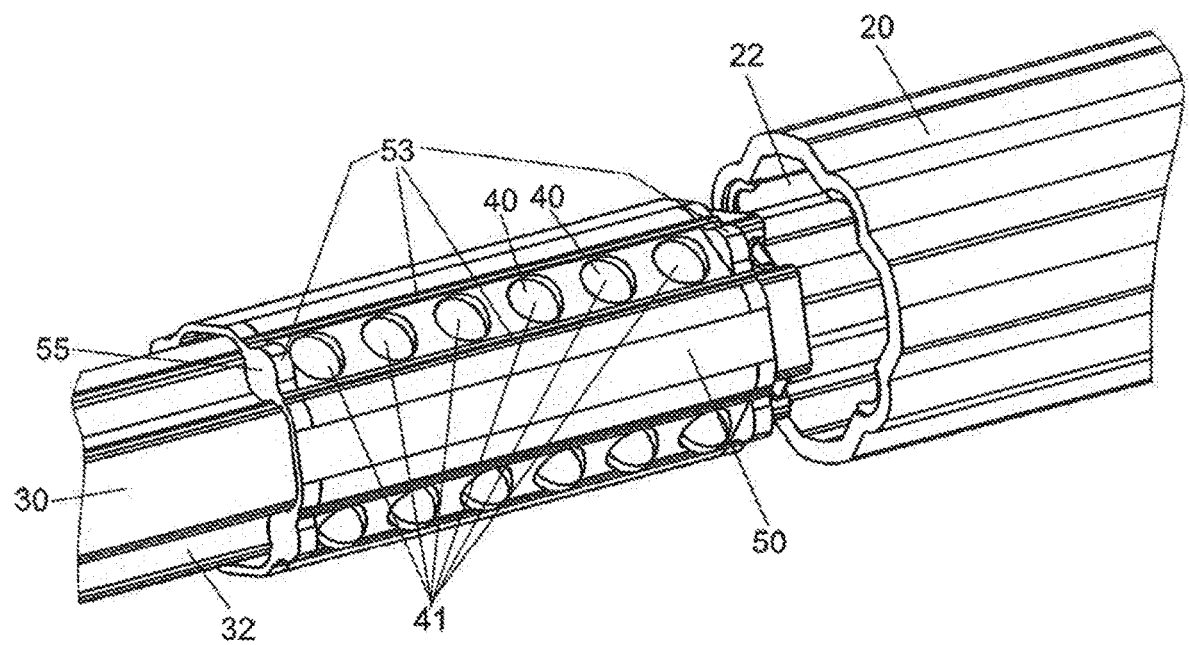
FIG. 6 is an exploded perspective view of a steering shaft as in FIG. 2 with an anti-friction bearing cage in a second embodiment.
Figure 7:
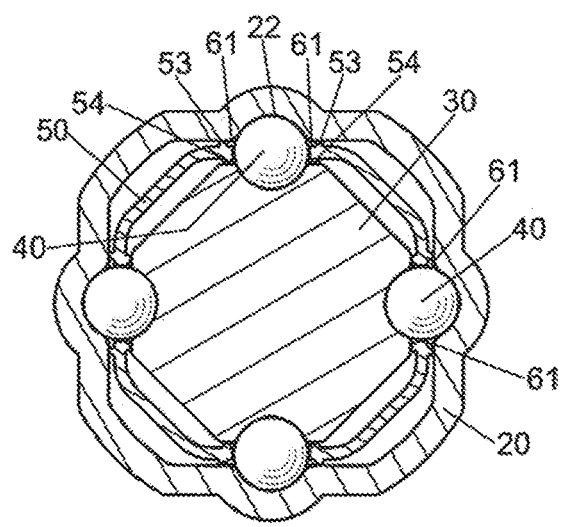
FIG. 7 is a cross sectional view A-A through the steering shaft according to FIG. 6 in the assembled state.

A second embodiment of the invention is shown in FIGS. 6 and 7. Therein, a seal element is configured as a web-shaped outer sealing lip 53 which is arranged on the outside on the anti-friction bearing cage 50. A further seal element is configured as a web-shaped inner sealing lip 54 which is arranged on the inside on the anti-friction bearing cage 50. The sealing lips 53 and 54 enclose in each case one surface region of the circumferential face, in which surface region a ball row 41 is situated which is formed from a plurality of balls 40 which are arranged in the longitudinal direction, from six balls 40 in the example which is shown.

The sealing lips 53 and 54 run in the longitudinal direction in each case along both sides of a ball row 41, and transversely with respect thereto in the circumferential direction over the circumference of shaped parts 55. The shaped parts 55 are of similar shape to the seal element 52 of the first embodiment according to FIG. 4 in the region of the grooves 22 and 32, and fill the groove cross section. As a result, the sealing lips 53 and 54 on the shaped parts 55 bear sealingly against the grooves 22 and 32, respectively.

The outer sealing lip 53 seals the enclosed region, in which the balls 40 of the ball row 41 are situated, against the hollow shaft 20. The inner sealing lip 54 seals the enclosed region, in which the balls 40 of the ball row 41 are situated, against the inner shaft 30. In a corresponding manner, in each case one spatial region 61 is enclosed by way of the seal elements according to the invention in the form of the sealing lips 53 and 54 and the surface regions of the hollow shaft 20 and the inner shaft 30 which are enclosed by in each case one sealing lip 53 or 54, in which spatial region 61 one or a plurality of balls 40 of a ball row 41 is/are situated. Accordingly, four spatial regions 61 of this type are configured in the example which is shown with four ball rows 41 which are arranged in the circumferential direction. As described above for the spatial region 60, the spatial regions 61 are filled with lubricant, for example lubricating grease. As a result, each of the spatial regions 61 forms a lubricant container for in each case one of the ball rows 41.

As described above for the spatial region 60, the balls 40 are supplied in the spatial regions 61 with lubricating grease. The sealing lips 53 and 54 likewise ensure that no contaminants pass to the balls 40, and also that no lubricant escapes to the outside.

The sealing lips 53 and 54 can enclose in each case one ball row 41 sealingly, or else can enclose groups of balls 40 within a ball row 41, or else can enclose individual balls 40.

In every case, one or more sealed spatial regions is/are provided by way of seal lips 53 and 54 according to the invention, which spatial region 61 are moved together with the rolling body cage 50 and in which spatial regions 61 the balls 40 are received.

The sealing lips 53 and 54 can be configured in one piece with the anti-friction bearing cage 50, and can preferably be manufactured using plastic injection molding. It is possible here that the anti-friction bearing cage 50 including the sealing lips 53 and 54 is molded from a thermoplastic polymer. Furthermore, it is one advantageous possibility that the body of the anti-friction bearing cage 50, in which the balls 40 are received, is molded from a mechanically resilient polymer, and the sealing lips 53 and 54 are molded in one piece onto the body from a rubber-like elastic elastomer.

As an alternative, it is conceivable and possible that the sealing lips 53 and 54 or seal elements 52 are separately manufactured completely or in part and are provided for subsequent mounting on the anti-friction bearing cage 50. For example, sealing lips 53 and 54 can be formed by way of O-rings which are made from an elastomer material and are fastened to the rolling body cage 50, for example by way of insertion into circumferential groove-like depressions. O-rings of this type can also be used on sealing elements 52, for circumferential sealing against the hollow shaft 20 and the inner shaft 30.

LIST OF DESIGNATIONS

1 Steering shaft
20 Hollow shaft
21 Fork
22 Groove
30 Inner shaft
31 Fork
32 Groove
40 Ball
41 Ball row
50 Rolling body cage
51 Rolling body receptacle
52 Seal element
521, 522 Sealing face
53, 54 Sealing lips
55 Shaped part
60, 61 Spatial region
L Longitudinal axis
A Spacing

What is claimed is:
1. A steering shaft for a motor vehicle, comprising:
a hollow shaft comprising an inner face, the inner face comprising longitudinal grooves formed therein;
an inner shaft arranged coaxially in the hollow shaft, the inner shaft comprising an outer face, the outer face comprising longitudinal grooves formed therein, each of the grooves of the outer face cooperatively positioned across from respective grooves of the inner face of the hollow shaft; and
a rolling body received in a rolling body cage, the rolling body disposed between the inner shaft and the hollow shaft and configured to roll in the direction of a longitudinal axis of the steering shaft so as to permit the inner shaft to telescope relative to the hollow shaft in the direction of the longitudinal axis; and
a seal element disposed on each end of the rolling body cage, each seal element comprising sealing faces, each of the sealing faces sized and shaped to bear and seal against a respective one of the hollow shaft and the inner shaft during telescoping of the inner shaft relative to the hollow shaft.

2. The steering shaft of claim 1, wherein the seal element is configured so as to run around the rolling body cage.

3. The steering shaft of claim 1, wherein the seal element is configured to run around on a circumferential face of the rolling body cage.

4. The steering shaft of claim 3, wherein the seal element encloses the rolling body or a group of rolling bodies.

5. The steering shaft of claim 1, wherein the seal element is of elastic configuration.

6. The steering shaft of claim 1, wherein the seal element is connected fixedly to the rolling body cage.

7. The steering shaft of claim 1, wherein the seal element is configured integrally in one piece with the rolling body cage.

8. The steering shaft of claim 1, wherein the rolling body cage is configured as a plastic injection molded part.

9. The steering shaft of claim 1, wherein a spatial region defined between the seal element and the rolling body cage and/or the inner shaft and/or the hollow shaft is filled at least partially with a lubricant.

\* \* \* \* \*